(12) United States Patent
Okabe et al.

(10) Patent No.: US 10,164,268 B2
(45) Date of Patent: Dec. 25, 2018

(54) FUEL CELL

(71) Applicant: TOYOTA JIDOSHA KABUSHIKI KAISHA, Toyota-shi, Aichi-ken (JP)

(72) Inventors: Hiroki Okabe, Okazaki (JP); Kenji Sato, Kasugai (JP); Takuya Kurihara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 78 days.

(21) Appl. No.: 15/024,434

(22) PCT Filed: Sep. 25, 2014

(86) PCT No.: PCT/IB2014/002127
§ 371 (c)(1),
(2) Date: Mar. 24, 2016

(87) PCT Pub. No.: WO2015/044774
PCT Pub. Date: Apr. 2, 2015

(65) Prior Publication Data
US 2016/0233528 A1   Aug. 11, 2016

(30) Foreign Application Priority Data

Sep. 27, 2013   (JP) .................................. 2013-201385

(51) Int. Cl.
*H01M 8/0273* (2016.01)
*H01M 8/0276* (2016.01)
(Continued)

(52) U.S. Cl.
CPC ....... *H01M 8/0273* (2013.01); *H01M 8/0258* (2013.01); *H01M 8/0263* (2013.01);
(Continued)

(58) Field of Classification Search
CPC .................................. H01M 8/02; H01M 8/24
See application file for complete search history.

(56) References Cited

U.S. PATENT DOCUMENTS

2002/0102453 A1   8/2002   Suenaga et al.
2008/0261104 A1  10/2008   Goto et al.
(Continued)

FOREIGN PATENT DOCUMENTS

EP   2 573 852 A1   3/2013
JP   2002-305006    10/2002
(Continued)

OTHER PUBLICATIONS

English-language translation of an excerpt of a Japan Patent Office Action ("Notification of Reason(s) for Refusal") in JP 2013-201385; drafting date: Nov. 4, 2015.

*Primary Examiner* — James Lee
(74) *Attorney, Agent, or Firm* — Finnegan, Henderson, Farabow, Garrett & Dunner, LLP

(57) ABSTRACT

A fuel cell includes a power generating body that includes an electrolyte membrane; a separator provided along the power generating body; a flow path through which a fluid to be supplied to the fuel cell flows; a first seal portion that surrounds the flow path in a surface of the separator, and inhibits the fluid from flowing out of the fuel cell; and an electrolytic corrosion inhibiting portion provided between the flow path and the first seal portion.

7 Claims, 6 Drawing Sheets

(51) Int. Cl.
*H01M 8/2483* (2016.01)
*H01M 8/2457* (2016.01)
*H01M 8/242* (2016.01)
*H01M 8/0267* (2016.01)
*H01M 8/0263* (2016.01)
*H01M 8/0258* (2016.01)
*H01M 8/02* (2016.01)
*H01M 8/1018* (2016.01)

(52) U.S. Cl.
CPC ....... *H01M 8/0267* (2013.01); *H01M 8/0276* (2013.01); *H01M 8/242* (2013.01); *H01M 8/2457* (2016.02); *H01M 8/2483* (2016.02); *H01M 8/02* (2013.01); *H01M 2008/1095* (2013.01)

(56) References Cited

U.S. PATENT DOCUMENTS

2009/0148749 A1* 6/2009 Okonogi ............. H01M 8/0282
429/492
2010/0119918 A1 5/2010 Hayashi
2013/0273449 A1 10/2013 Uehara et al.

FOREIGN PATENT DOCUMENTS

| JP | 2004-265824 | 9/2004 |
| JP | 2006-147468 | 6/2006 |
| JP | 2007-294331 A | 11/2007 |
| JP | 2008-204819 | 9/2008 |
| JP | 2011-165570 | 8/2011 |
| WO | WO 2012/081333 A1 | 6/2012 |
| WO | WO 2012/114668 A1 | 8/2012 |

\* cited by examiner

FIRST SURFACE SIDE ⟷ SECOND SURFACE SIDE

FUEL CELL

CROSS-REFERENCE TO RELATED APPLICATIONS

This application is a national phase application of International Application No. PCT/IB2014/002127, filed Sep. 25, 2014, and claims the priority of Japanese Application No. 2013-201385, filed Sep. 27, 2013, the content of both of which is incorporated herein by reference.

BACKGROUND OF THE INVENTION

1. Field of the Invention

The invention relates to a fuel cell.

2. Description of Related Art

A fuel cell is formed by a plurality of single cells, each of which is a basic unit of power generation, stacked together. Each single cell includes a membrane electrode assembly, and a pair of separators that sandwich the membrane electrode assembly. Manifolds through which fluids (oxidant gas, fuel gas, and a cooling medium) to be supplied to the fuel cell flow, are formed on a peripheral edge portion of each single cell (see Japanese Patent Application Publication No. 2006-147468 (JP 2006-147468 A)). A seal member that surrounds each manifold is provided in the surface of the separators. This seal member inhibits the fluids from flowing out of the fuel cell.

When the fuel cell is generating power, a localized electrical circuit may form near the manifold, through moisture in the manifold, and current may flow. If the current flows to a portion of the separator that is exposed inside the manifold, the surface of the separator may oxidize and deteriorate. This type of phenomenon is referred to as electrolytic corrosion. If electrolytic corrosion occurs, deterioration of the separator will gradually progress, and the seal member arranged in the surface of the separator may end up peeling. Therefore, technology that enables peeling of a seal member due to electrolytic corrosion to be inhibited in a fuel cell in which a seal member is arranged in the surface of a separator, has been sought after. This kind of problem is not limited to a manifold through which a cooling medium flows, and may also occur in an anode-side manifold and a cathode-side manifold through which produced water flows. In addition, in conventional fuel cells, simplified structures that are less costly, save more resources, and are smaller and the like are desired.

SUMMARY OF THE INVENTION

A first aspect of the invention relates to a fuel cell that includes a power generating body that includes an electrolyte membrane; a separator provided along the power generating body; a flow path through which a fluid to be supplied to the fuel cell flows; a first seal portion that surrounds the flow path in a surface of the separator, and inhibits the fluid from flowing out of the fuel cell; and an electrolytic corrosion inhibiting portion provided between the flow path and the first seal portion. According to this kind of fuel cell, the electrolytic corrosion inhibiting portion is provided between the first seal portion and the flow path through which a fluid to be supplied to the fuel cell flows. Therefore, the first seal portion arranged on an outside of the electrolytic corrosion inhibiting portion is able to be inhibited from peeling due to electrolytic corrosion.

The flow path may be a manifold that is formed passing through the surface of the separator, and through which a hydrogen-containing gas flows. The power generating body and the separator may be stacked in a direction perpendicular to a gravitational direction. The electrolytic corrosion inhibiting portion may include a second seal portion of which at least one portion is arranged on a lower side in the gravitational direction of the manifold, when the fuel cell is installed. Electrolytic corrosion occurs through moisture that accumulates in the manifold. Therefore, the electrolytic corrosion inhibiting portion (i.e., the second seal portion) is provided on at least a lower side in the gravitational direction of the manifold. Accordingly, the material for forming the electrolytic corrosion inhibiting portion is able to be reduced.

The flow path may include a manifold formed passing through the surface of the separator; and the electrolytic corrosion inhibiting portion may include a second seal portion provided between the manifold and the first seal portion, and an extended portion of which at least a portion is provided in a different position than the second seal portion, and in which a portion of the separator that forms an outer edge of the manifold extends toward an inside of the manifold. In this way, the distance from the manifold to the first seal portion increases due to the extended portion, so electrical resistance of the circuit through which the current that causes electrolytic corrosion flows increases. As a result, electrolytic corrosion is able to be effectively inhibited by providing the extended portion, even at a portion where the second seal portion is not formed.

The extended portion may be formed on one separator, from among a pair of separators that sandwich the power generating body. In this way, the weight of the fuel cell is able to be inhibited from increasing because the extended portion is formed only on one of the two separators.

A height of the second seal portion may be lower than a height of the first seal portion. As a result, rattling is able to be inhibited from occurring when the seal portion contacts the separator. Also, the second seal portion is able to serve as a sizing portion, so the sealing performance of the first seal portion can be improved.

The invention is not limited to the modes of the fuel cell described above, but may be realized by any of a variety of modes. For example, the invention may also be realized by a mode of a manufacturing method of the fuel cell, or a vehicle provided with the fuel cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A. Example Embodiment

Figure 1:
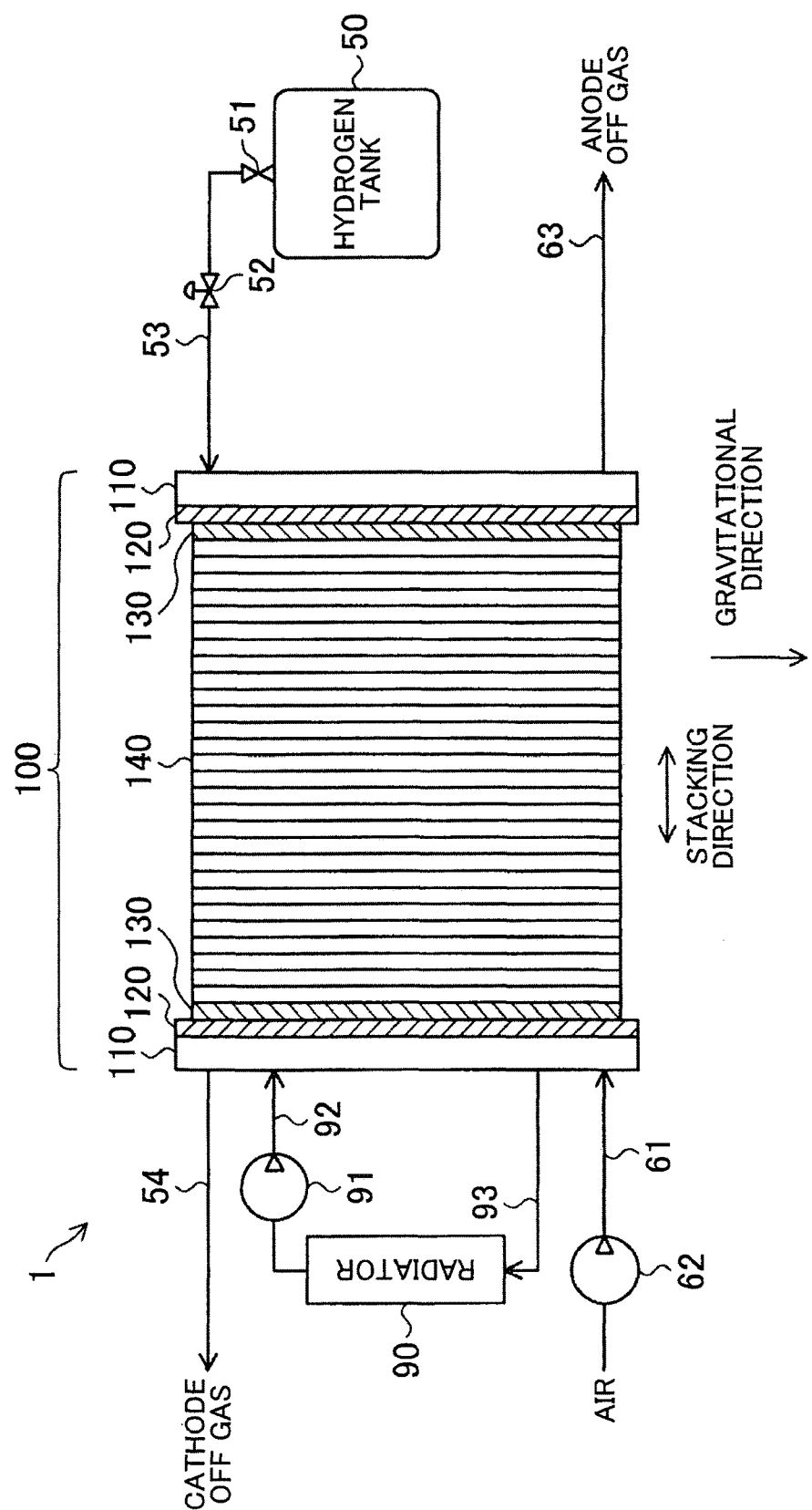
FIG. 1 is an explanatory view showing the general structure of a fuel cell system according to one example embodiment of the invention.

FIG. 1 is an explanatory view showing the general structure of a fuel cell system 1 according to one example embodiment of the invention. The fuel cell system 1 includes a fuel cell 100 that generates power by causing an electrochemical reaction using reaction gases (a fuel gas and an oxidant gas). The fuel cell system 1 is mounted in a vehicle, for example.

The fuel cell 100 has a stacked structure in which an end plate 110, an insulating plate 120, a collector plate 130, a plurality of single cells 140, a collector plate 130, an insulating plate 120, and an end plate 110 are stacked together in this order. In the description below, the direction in which the plurality of single cells 140 are stacked will be referred to as the "stacking direction". This stacking direction is a direction that is perpendicular to the gravitational direction when the fuel cell 100 is installed.

Hydrogen as the fuel gas is supplied from a hydrogen tank 50 within which high-pressure hydrogen is stored, to the fuel cell 100 via a shut-off valve 51, a regulator 52, and a conduit 53. The fuel gas not used in the generation of power in the fuel cell 100 (i.e., anode off gas) is discharged out of the fuel cell 100 via a discharge conduit 63. The fuel cell system 1 may have a recirculation function of recirculating the anode off gas to the conduit 53 side. Air as the oxidant gas is also supplied to the fuel cell 100 via an air pump 62 and a conduit 61. Oxidant gas not used to in the generation of power in the fuel cell 100 (i.e., cathode off gas) is discharged out of the fuel cell 100 via a discharge conduit 54.

In order to cool the fuel cell 100, a cooling medium that is cooled by a radiator 90 is supplied to the fuel cell 100 via a water pump 91 and a conduit 92. Cooling medium that is discharged from the fuel cell 100 is circulated to the radiator 90 via a conduit 93. Water, antifreeze such as ethylene glycol, or air, for example, may be used as the cooling medium. The fuel gas, the oxidant gas and the cooling medium may be regarded as a fluid of the present invention.

Figure 2:
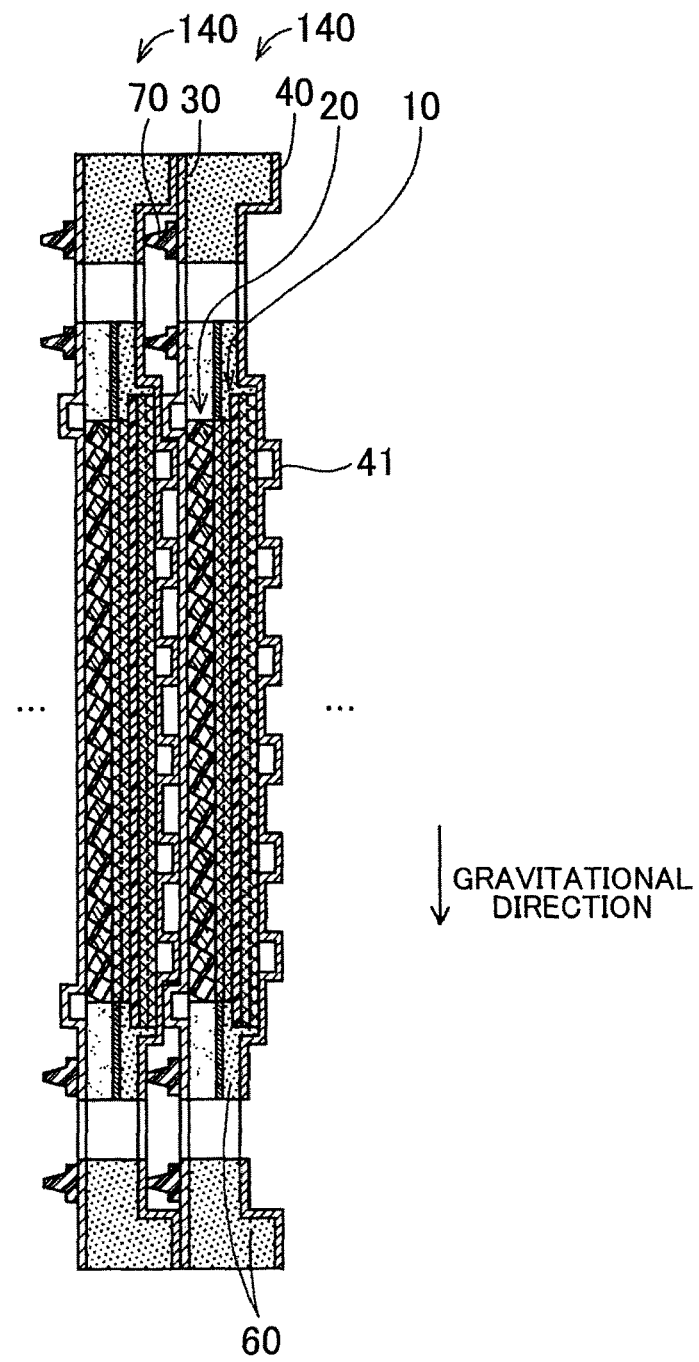
FIG. 2 is a sectional view showing a frame format of the general structure of a single cell.

FIG. 2 is a sectional view showing a frame format of the general structure of the single cells 140. Each single cell 140 includes a membrane electrode assembly 10, a gas diffusion member 20, a first separator 30, a second separator 40, and a first seal portion 70. The downward direction in FIG. 2 is a downward direction in the gravitational direction when the fuel cell 100 is installed. With each of the members shown in FIG. 2, the surface on the left side will be referred to as a "first surface", and the surface on the right side will be referred to as a "second surface". The membrane electrode assembly 10 may be regarded as a power generating body of the present invention.

The membrane electrode assembly 10 is formed by a cathode catalyst layer arranged on one surface of an electrolyte membrane, and an anode catalyst layer arranged on the other surface of the electrolyte membrane, as is well known. The electrolyte membrane is a solid polymer membrane made of fluorine resin material or hydrocarbon resin material or the like, and has good proton conductivity in a wet state. The cathode catalyst layer and the anode catalyst layer include platinum or an alloy of platinum and another metal as the catalyst, for example. A gas diffusion layer may also be formed by a porous fiber substructure that has conductivity and gas permeable/gas diffusive characteristics such as carbon fiber or graphite fiber, on the surface of each catalyst layer. Water is produced as a result of power generation on the cathode side of the membrane electrode assembly 10, but this water (i.e., produced water) also permeates the membrane electrode assembly 10 and flows out to the anode side.

The membrane electrode assembly 10 is sandwiched by the first separator 30 and the second separator 40. The first separator 30 and the second separator 40 are each formed by a plate-shaped member having conductivity such as a metal plate. A center portion of the first separator 30 is formed in a planar shape. A wavy plate-shaped flow path groove 41 is formed in a center portion of the second separator 40. The flow path groove 41 formed in the second separator 40 of another single cell 140 that is adjacent on the first surface side contacts the first surface side of the first separator 30. A cooling medium that is supplied from a cooling medium supply manifold 172, described later, flows between the second surface of this flow path groove 41 and the first surface of the first separator 30. Also, fuel gas that is supplied from a fuel gas supply manifold 162, described later, flows between the first surface side of the flow path groove 41 formed in the second separator 40 and the anode catalyst layer of the membrane electrode assembly 10.

The gas diffusion member 20 is arranged between the cathode catalyst layer of the membrane electrode assembly 10 and the first separator 30. The gas diffusion member 20 is a porous plate-shaped member having conductivity. In this example embodiment, so-called expanded metal that is made by forming a single sheet of metal plate in a lattice-like structure by cutting and bending, is used as the gas diffusion member 20. Oxidant gas that is supplied from an oxidant gas supply manifold 152, described later, flows into the gas diffusion member 20.

An adhesion layer 60 is provided on an outer peripheral portion of the membrane electrode assembly 10. The membrane electrode assembly 10 and the first and second separators 30 and 40 are integrated, including the gas diffusion member 20, by this adhesion layer 60. The adhesion layer 60 functions both as a seal layer for preventing fluid that flows to the single cell 140 from leaking, and as an insulating layer that electrically insulates the first separator 30 from the second separator 40. The adhesion layer 60 is made of rubber or resin, for example.

The first seal portion 70 is arranged on the first surface side of the first separator 30. The first seal portion 70 contacts the second surface side of the second separator 40 of the adjacent single cell 140. The first seal portion 70 inhibits the fluid that flows through the manifolds, described later, from flowing out of the fuel cell 100. The first seal portion 70 is formed by a member that is gas impermeable, elastic, and heat resistant in a driving temperature range of the fuel cell, for example, e.g., an elastic member of rubber or elastomer, for example.

Figure 3:
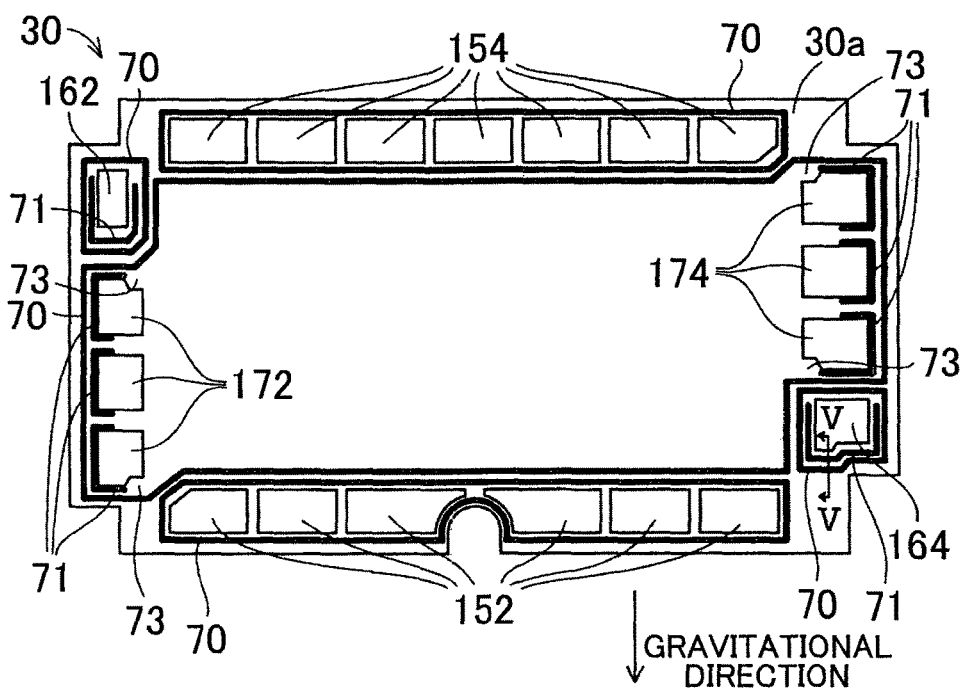
FIG. 3 is a view of the general structure of a first separator.
Figure 4:
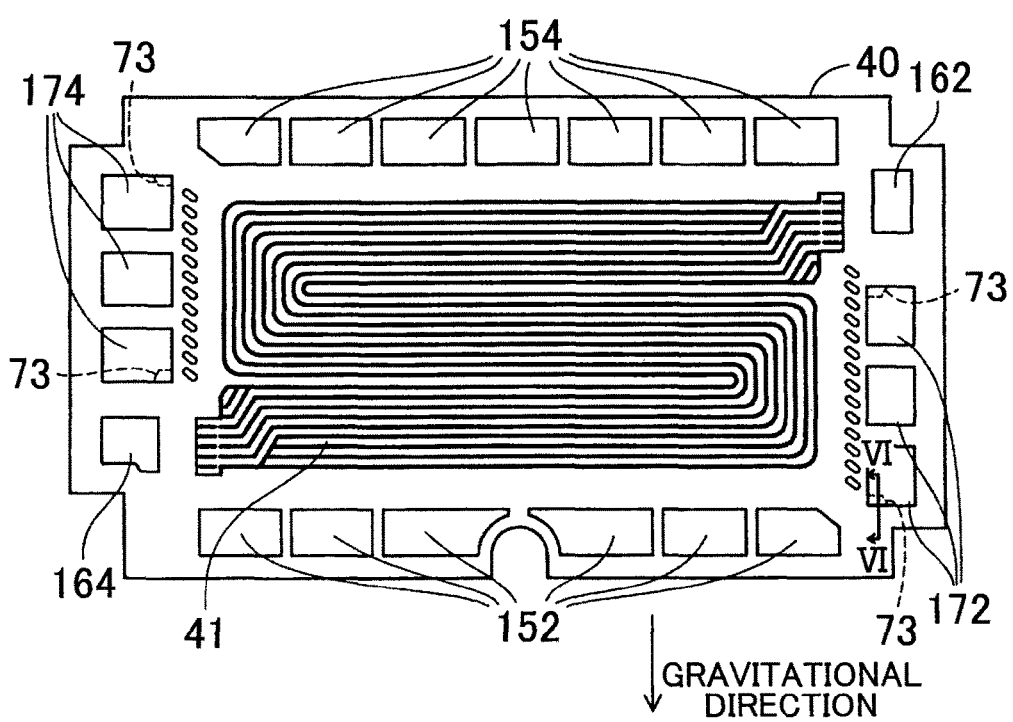
FIG. 4 is a view of the general structure of a second separator.

FIG. 3 is a view of the general structure of the first separator 30, and shows the first separator 30 viewed from the first surface side. FIG. 4 is a view of the general structure of the second separator 40, and shows the second separator 40 viewed from the second surface side. As shown in FIGS. 3 and 4, the following six types of manifolds are formed on each of the first separator 30 and the second separator 40. These manifolds are formed in the stacking direction of the fuel cell 100, penetrating the peripheral edge portion of each single cell 140.

(A) The oxidant gas supply manifold 152 that distributes oxidant gas to the single cells 140

(B) An oxidant gas discharge manifold 154 that collects oxidant gas not used for power generation in the single cells 140 and discharges that oxidant gas out of the fuel cell 100

(C) The fuel gas supply manifold 162 that distributes fuel gas to the single cells 140

(D) A fuel gas discharge manifold 164 that collects fuel gas not used for power generation in the single cells 140 and discharges that fuel gas out of the fuel cell 100

(E) The cooling medium supply manifold 172 that distributes the cooling medium to the single cells 140

(F) A cooling medium discharge manifold 174 that collects cooling medium discharged from the single cells 140 and discharges that cooling medium out of the fuel cell 100

As shown in FIGS. 3 and 4, in this example embodiment, the oxidant gas supply manifold 152 is arranged along a lower side of the single cell 140 in the gravitational direction, when the fuel cell 100 is installed. Also, the oxidant gas discharge manifold 154 is arranged along an upper side of the single cell 140 in the gravitational direction. Further, the fuel gas supply manifold 162 is arranged on an upper side in the gravitational direction, along the left side of the single cell 140 in FIG. 3. Also, the cooling medium discharge manifold 174 is arranged on the upper side in the gravitational direction, along the right side of the single cell 140 in FIG. 3. Further, the fuel gas discharge manifold 164 is arranged on the lower side in the gravitational direction, along the right side of the single cell 140 in FIG. 3.

As shown in FIG. 3, each manifold is surrounded in a continuous (seamless) manner by the first seal portion 70, at a first surface 30a of the first separator 30. Each manifold may be regarded as a flow path of the present invention. Also, a flow path formed on the surface of the separator as a result of being surrounded by the first seal portion 70 at the first surface 30a of the first separator 30 (i.e., a flow path between the cooling medium supply manifold 172 and the cooling medium discharge manifold 174) may also be regarded as a flow path of the present invention.

In this example embodiment, a second seal portion 71 is arranged between the fuel gas supply manifold 162 and the first seal portion 70, between the fuel gas discharge manifold 164 and the first seal portion 70, between the cooling medium supply manifold 172 and the first seal portion 70, and between the cooling medium discharge manifold 174 and the first seal portion 70. That is, a double seal line is formed on the fuel gas supply manifold 162, the fuel gas discharge manifold 164, the cooling medium supply manifold 172, and the cooling medium discharge manifold 174. The second seal portion 71 inhibits the first seal portion 70 from peeling as a result of the surface of the separator deteriorating due to electrolytic corrosion. The second seal portion 71 may be regarded as an electrolytic corrosion inhibiting portion of the present invention.

The second seal portion 71 is provided on a portion around the corresponding manifold. More specifically, the second seal portion 71 provided for the fuel gas supply manifold 162 and the fuel gas discharge manifold 164 is arranged along a lower portion in the gravitational direction of the fuel gas supply manifold 162 and the fuel gas discharge manifold 164. That is, the second seal portion 71 provided for the fuel gas supply manifold 162 and the fuel gas discharge manifold 164 has a cut line in a portion corresponding to the upper side in the gravitational direction of the fuel gas supply manifold 162 and the fuel gas discharge manifold 164. The reason for providing the second seal portion 71 only on the lower side of the fuel gas supply manifold 162 and the fuel gas discharge manifold 164 in this way is because electrolytic corrosion will not occur on the upper side in the gravitational direction of these manifolds, due to the fact that water resulting from electrolytic corrosion (i.e., produced water) will not flow to the extent in which it fills up the entire flow paths of these manifolds.

Also, the second seal portion 71 provided for the cooling medium supply manifold 172 and the cooling medium discharge manifold 174 is provided on the side of the manifolds where the first seal portion 70 is provided (i.e., the side corresponding to the outside of the separator. That is, the second seal portion 71 provided for the cooling medium supply manifold 172 and the cooling medium discharge manifold 174 has a cut line on the side where the first seal portion 70 is not provided (i.e., on the side corresponding to the inside of the separator). The reason for having the cut line in such a position is because the flow of the cooling medium between the cooling medium supply manifold 172 and the cooling medium discharge manifold 174 will be impeded if the second seal portion 71 is provided on the side where the first seal portion 70 is not provided.

The second seal portion 71 need simply be a seal member that is near the manifold in order to inhibit the first seal portion 70 from peeling due to electrolytic corrosion, and be provided on a portion that may be affected by electrolytic corrosion. Therefore, the second seal portion 71 does not need to be surrounding the entire periphery of the manifold like the first seal portion 70, but need only be provided on a portion around the manifold. Accordingly, the material for forming the second seal portion 71 is able to be reduced.

Figure 5:
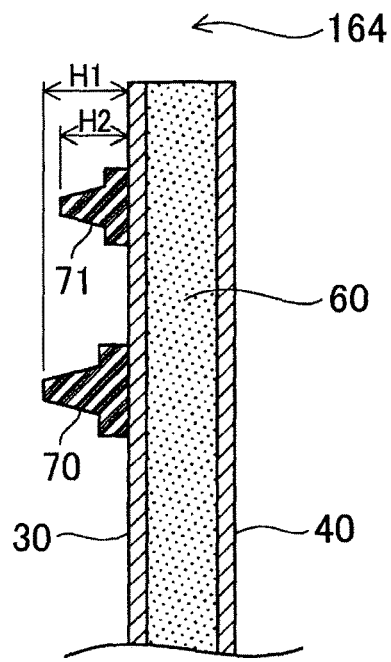
FIG. 5 is a view showing a frame format of a cross-section taken along line V-V in FIG. 3.

FIG. 5 is a view showing a frame format of a cross-section taken along line V-V in FIG. 3. As shown in FIG. 5, in this example embodiment, a height H2 in the stacking direction of the second seal portion 71 is formed lower than a height H1 of the first seal portion 70. Therefore, rattling is inhibited from occurring when the first seal portion 70 that surrounds the entire outer periphery of the manifold contacts the adjacent single cell 140. Also, the second seal portion 71 is designed to inhibit electrolytic corrosion, not to inhibit fluid from flowing out. Therefore, it does not matter if the height of the second seal portion 71 is lower than the height of the first seal portion 70. Also, with this kind of structure, the second seal portion 71 can be made to serve as a sizing portion for specifying the intervals between the single cell 140. Accordingly, the first seal portion 70 may serve solely as a seal, enabling the sealing performance to be improved. In another example embodiment, the height H2 of the second seal portion 71 and the height H1 of the first seal portion 70 may be the same.

As shown in FIG. 3, an extended portion 73 is provided on a portion of an outer edge of the cooling medium supply manifold 172 and the cooling medium discharge manifold 174, on the first separator 30. This extended portion 73 is formed by extending a portion of the first separator 30 that forms the outer edge of the cooling medium supply manifold 172 and the cooling medium discharge manifold 174 toward the inside of these manifolds. This extended portion 73 is provided to increase the distance between these manifolds and the first seal portion 70 that surrounds both the cooling medium supply manifold 172 and the cooling medium discharge manifold 174. This is because the effect that electrolytic corrosion has on the first seal portion 70 is able to be increasingly inhibited the greater this distance is, as will be described later. The extended portion 73 is provided in a position near the first seal portion 70 that surrounds both the cooling medium supply manifold 172 and the cooling medium discharge manifold 174. Also, the extended portion 73 is provided in a position where the second seal portion 71 is not provided (i.e., in a position where it is difficult to provide the second seal portion 71). That is, the extended portion 73 is provided in a position that is different than the position where the second seal portion 71 is provided. However, the positions where the second seal portion 71 and the extended portion 73 are provided do not have to be completely different positions, i.e., a portion may overlap. The extended portion 73 may be regarded as an electrolytic corrosion inhibiting portion of the present invention, similar to the second seal portion 71. That is, in this example embodiment, the second seal portion 71 and the extended portion 73 are provided in the fuel cell 100 as electrolytic corrosion inhibiting portions.

Figure 6:
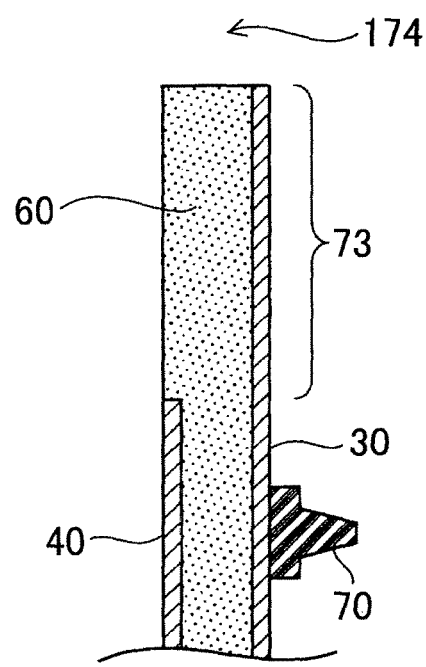
FIG. 6 is a view showing a frame format of a cross-section taken along line VI-VI in FIG. 4.

FIG. 6 is a view showing a frame format of a cross-section taken along line VI-VI in FIG. 4. As shown in FIG. 6, in this example embodiment, the extended portion 73 is formed on only the first separator 30, from among the first separator 30 and the second separator 40 that sandwich the membrane electrode assembly 10. The adhesion layer 60 is arranged on the second surface (i.e., back surface) side of the second separator 40, but the second separator 40 is not arranged there. That is, the extended portion 73 is not formed on the second separator 40. Therefore, the weight of the fuel cell system 1 is able to be inhibited from increasing by providing the extended portion 73 on the second separator 40. Also, interruption of the flow of fluid from the cooling medium supply manifold 172 is able to be inhibited by providing the extended portion 73 on the second separator 40.

Figure 7:
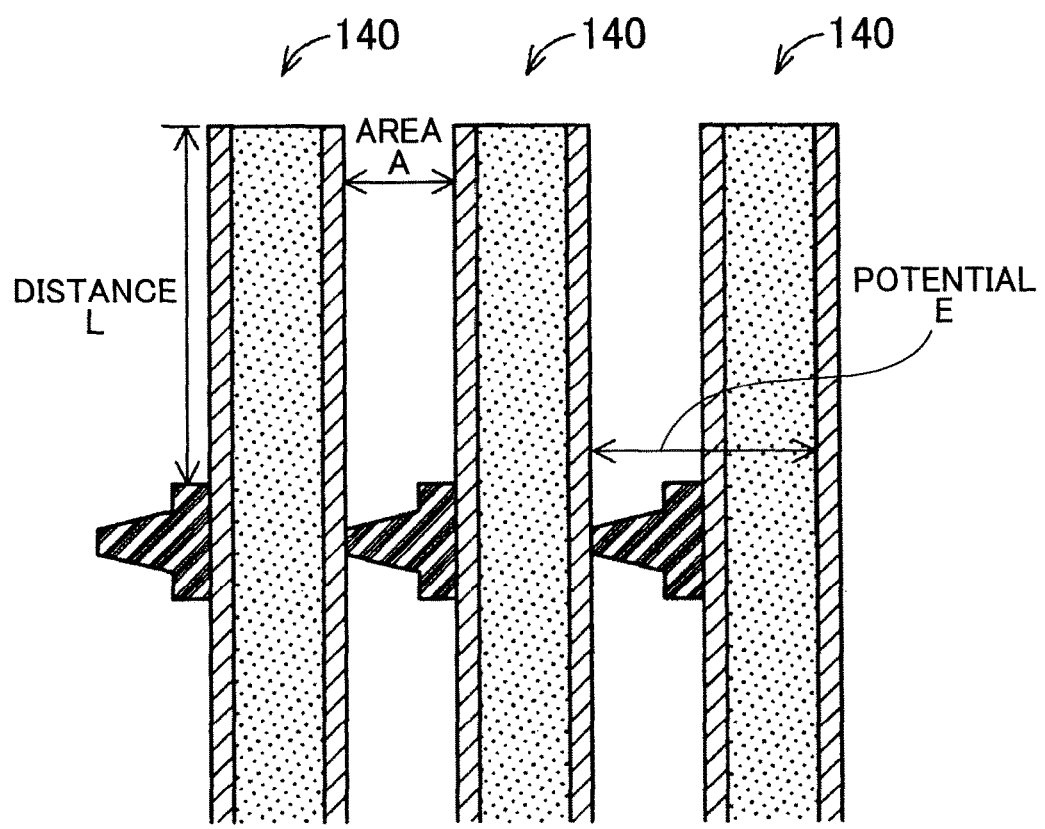
FIG. 7 is a view illustrating effects obtained by the example embodiment.

FIG. 7 is a view illustrating the effects of this example embodiment. When power is generated by the fuel cell 100, an oxidation reaction may consequently take place on the surface of the separators 30 and 40, through the produced water and the cooling medium in the manifolds. When an oxidation reaction takes place and the separators 30 and 40 made of titanium are surface treated with carbon, TiC (titanium carbide) at the boundary between the titanium and the carbon oxidizes and peels. This kind of phenomenon is referred to as electrolytic corrosion. The oxidation reaction may be expressed as shown in Expression (1) below, for example.

$$TiC + H_2O \rightarrow Ti^{3+} + CO + 2H^+ + 5e^- \quad (1)$$

When this kind of reaction takes place, a localized electrical circuit forms near the manifolds, and current flows. The larger the current that flows, the faster the rate of the oxidation reaction, and the faster peeling progresses. The amount of current I is expressed by Expression (2) below, for example.

$$I = E/(L/(\sigma * A)) \quad (2)$$

where I is the current, E is the voltage (approximately 1 V) of the single cell 140 when power is being generated, L is the distance from the manifold to the seal portion, σ is the conductivity of the produced water or the cooling medium, and A is the open area of the space between single cells 140 at the outer periphery of the manifold With respect to this kind of phenomenon, in the fuel cell 100 of this example embodiment, the second seal portion 71 is arranged to the inside of the first seal portion 70, and the open area A of the space between the single cells 140 is narrower because of this second seal portion 71. Accordingly, the electrical resistance of the circuit through which the current I flows increases, so the current I becomes smaller. Referring to Expression (2) above as well, it is evident that the current I decreases the smaller the value of the open area A becomes. Therefore, with this example embodiment, electrolytic corrosion is inhibited from progressing to the first seal portion 70 as a result of providing the second seal portion 71, and as a result, the first seal portion 70 is able to be inhibited from peeling. In particular, with this example embodiment, the second seal portion 71 is arranged for the fuel gas supply manifold 162 and the fuel gas discharge manifold 164, so the outflow of fuel gas is able to be inhibited.

Also, in this example embodiment, the extended portion 73 is provided on the peripheral edge of the cooling medium supply manifold 172 and the cooling medium discharge manifold 174. Therefore, a distance L from the cooling medium supply manifold 172 and the cooling medium discharge manifold 174 to the first seal portion 70 that surrounds both of these manifolds increases. Accordingly, the electrical resistance of the circuit through which the current I flows increases, so the current becomes smaller. Referring to Expression (2) above as well, it is evident that the current I decreases as the value of the distance L increases. Therefore, with this example embodiment, progression of electrolytic corrosion is able to be inhibited by providing the extended portion 73, so the first seal portion 70 is able to be inhibited from peeling.

Further, the extended portion 73 can be arranged on a portion where the flow of fluid is impeded (i.e., a position between the cooling medium supply manifold 172 and the cooling medium discharge manifold 174), when the second seal portion 71 is arranged around the manifold. That is, with this example embodiment, electrolytic corrosion is able to be effectively inhibited by providing the extended portion 73, even at a portion where the second seal portion 71 is not provided.

B. Modified example: In the example embodiment described above, the fuel cell 100 is provided with both the second seal portion 71 and the extended portion 73 as electrolytic corrosion inhibiting portions, but the fuel cell 100 may also be provided with only one of these two.

In the example embodiment described above, the second seal portion 71 is provided for the fuel gas supply manifold 162, the fuel gas discharge manifold 164, the cooling medium supply manifold 172, and the cooling medium discharge manifold 174. However, the second seal portion 71 may also be provided for all or some of the fuel gas supply manifold 162, the fuel gas discharge manifold 164, the oxidant gas supply manifold 152, the oxidant gas discharge manifold 154, the cooling medium supply manifold 172, and the cooling medium discharge manifold 174.

In the example embodiment described above, the second seal portion 71 surrounds a portion of the outer periphery of the manifolds, but the second seal portion 71 may also be formed surrounding the entire outer periphery of manifolds other than the cooling medium supply manifold 172 and the cooling medium discharge manifold 174 (i.e., the fuel gas supply manifold 162, the fuel gas discharge manifold 164, the oxidant gas supply manifold 152, and the oxidant gas discharge manifold 154).

In the example embodiment described above, the extended portion 73 is provided only on the first separator 30. However, the extended portion 73 may also be provided on both the first separator 30 and the second separator 40. Also, in the example embodiment described above, the adhesion layer 60 is provided on the back surface of the extended portion 73, but the adhesion layer 60 does not have to be provided on the back surface of the extended portion 73. Further, the extended portion 73 may also be provided on only the second separator 40. Aside from this, the extended portion 73 may also be formed by only the adhesion layer 60.

In the example embodiment described above, the extended portion 73 is provided on the cooling medium supply manifold 172 and the cooling medium discharge manifold 174. However, the extended portion 73 may also be provided on all or some of the cooling medium supply manifold 172, the cooling medium discharge manifold 174, the oxidant gas supply manifold 152, the oxidant gas discharge manifold 154, the fuel gas supply manifold 162, and the fuel gas discharge manifold 164.

In the example embodiment described above, the structure of the single cell 140 may be modified as appropriate. For example, each of the flow paths through which the oxidant gas, the fuel gas, and the cooling medium flow along the membrane electrode assembly 10 are not limited to being expanded metal or flow path grooves, i.e., various modes may also be employed. Also, the material of each portion that forms the fuel cell 100 is not limited to being the material described in the example embodiment described above. Any of a variety of suitable materials may be used. Also, the arrangement of the manifolds formed in the fuel cell 100 is only an example. Different arrangements may also be employed.

The invention is not limited to the example embodiments and modified examples described above, and may be realized by any of a variety of structures without departing from the scope thereof. The technical features of the example embodiment may be replaced or combined as appropriate to solve all or some of the aforementioned problems, or to achieve all or some of the aforementioned effects. Also, the technical features of the invention may be omitted as appropriate unless described as being absolutely necessary in this specification.

The invention claimed is:

1. A fuel cell comprising:
a power generating body that includes an electrolyte membrane;
a separator provided along the power generating body;
a flow path through which a fluid to be supplied to the fuel cell flows;
a first seal portion that surrounds the flow path in a surface of the separator, and inhibits the fluid from flowing out of the fuel cell; and
an electrolytic corrosion inhibiting portion provided between the flow path and the first seal portion; wherein:
the flow path includes a manifold; and
the electrolytic corrosion inhibiting portion includes a second seal portion provided on only a portion around the manifold, the second seal portion forming a continuous seal along at least three peripheral sides around the manifold including a lower side in a gravitational direction of the manifold, the gravitational direction being perpendicular to a stacking direction of the power generating body and the separator, wherein the second seal portion terminates at a portion corresponding to an upper side in the gravitational direction of the manifold.

2. The fuel cell according to claim 1, wherein
the manifold is formed passing through the surface of the separator, through which a hydrogen-containing gas flows; and
the power generating body and the separator are stacked in a direction perpendicular to the gravitational direction when the fuel cell is installed.

3. The fuel cell according to claim 1, wherein
the manifold passes through the surface of the separator;
the second seal portion is provided between the manifold and the first seal portion; and
the electrolytic corrosion inhibiting portion includes an extended portion of which at least a portion is provided in a different position than the second seal portion, and in which a portion of the separator that forms an outer edge of the manifold extends toward an inside of the manifold.

4. The fuel cell according to claim 3, wherein
the extended portion is formed on one separator, from among a pair of separators that sandwich the power generating body.

5. The fuel cell according to claim 2, wherein
a height of the second seal portion is lower than a height of the first seal portion.

6. The fuel cell according to claim 3, wherein a height of the second seal portion is lower than a height of the first seal portion.

7. The fuel cell according to claim 4, wherein a height of the second seal portion is lower than a height of the first seal portion.

* * * * *